United States Patent [19]

Nikolaus

[11] Patent Number: 5,159,812
[45] Date of Patent: Nov. 3, 1992

[54] CIRCUITRY FOR CONTROLLING CONTROL COILS OF SERVO DEVICES IN A HYDRAULIC SYSTEM

[75] Inventor: Heinrich Nikolaus, Hamburg, Fed. Rep. of Germany

[73] Assignee: Mannesmann Rexroth GmbH, Lohr/Main, Fed. Rep. of Germany

[21] Appl. No.: 633,084

[22] Filed: Dec. 21, 1990

[30] Foreign Application Priority Data

Dec. 29, 1989 [DE] Fed. Rep. of Germany ....... 3943357

[51] Int. Cl.$^5$ .................... F15B 11/16; F04B 1/08; H01F 7/18
[52] U.S. Cl. .................... 60/445; 60/459; 60/465
[58] Field of Search ............... 60/422, 445, 450, 452, 60/465, 462; 417/218

[56] References Cited

U.S. PATENT DOCUMENTS

| | | | |
|---|---|---|---|
| 2,892,312 | 6/1959 | Allen et al. | 60/450 X |
| 3,579,987 | 5/1971 | Busse | 60/445 X |
| 3,726,093 | 4/1973 | Malott | 60/445 |
| 3,987,622 | 10/1976 | Johnson | 60/445 X |
| 4,479,349 | 10/1984 | Westveer | 60/450 X |
| 4,708,596 | 11/1987 | Palm et al. | 60/450 X |
| 4,712,376 | 12/1987 | Hadank et al. | 60/452 X |
| 4,759,183 | 7/1988 | Kreth et al. | 60/442 |
| 4,822,252 | 4/1989 | Ishikawa et al. | 417/222 |
| 4,823,551 | 4/1989 | Hehl | 60/442 |
| 4,823,552 | 4/1989 | Ezell et al. | 60/443 |
| 4,856,278 | 8/1989 | Widmann et al. | 60/452 X |
| 4,870,819 | 10/1989 | Walzer | 60/422 |
| 4,884,402 | 12/1989 | Strenzke et al. | 60/465 X |
| 5,042,251 | 8/1991 | Berthold | 60/452 X |
| 5,046,927 | 9/1991 | Ohno et al. | 417/222 S |
| 5,050,379 | 9/1991 | Nagai et al. | 60/422 X |

FOREIGN PATENT DOCUMENTS

| | | |
|---|---|---|
| 1801137 | 4/1970 | Fed. Rep. of Germany . |
| 3422089 | 12/1985 | Fed. Rep. of Germany . |
| 3506849 | 6/1986 | Fed. Rep. of Germany . |
| 3532816 | 3/1987 | Fed. Rep. of Germany . |
| 3546336 | 7/1987 | Fed. Rep. of Germany . |
| 2651325 | 7/1988 | Fed. Rep. of Germany . |
| 3644736 | 7/1988 | Fed. Rep. of Germany . |

*Primary Examiner*—Edward K. Look
*Assistant Examiner*—John Ryznic
*Attorney, Agent, or Firm*—Harness, Dickey & Pierce

[57] ABSTRACT

The invention refers to a hydraulic system comprising at least a variable displacement pump and at least a consumer. Means are provided to generate electrical limit signals when at least one of the consumers, preferably a load leading consumer indicates the need for an increased delivery rate or when the variable displacement pump indicates a hydraulic under-supply. In response to the limit signals generated by the consumer need or the pump are varied in a control circuit to adjust the control signals delivered to the servo devices of the hydraulic systems such that the pump control is optimized and that the flow rates to the consumers are decreased in the mode of under-supply. In addition very simple electrical circuits are disclosed to substantially reduce the expenditure of the system.

9 Claims, 3 Drawing Sheets

CIRCUITRY FOR CONTROLLING CONTROL COILS OF SERVO DEVICES IN A HYDRAULIC SYSTEM

BACKGROUND OF THE INVENTION

The present invention relates to a circuitry including an electronic control circuit for controlling the control coils of preferably a number of servo devices in a hydraulic system.

According to the prior art the pump delivery rate has to be adjusted in response to the delivery rates which are required by the consumers in a hydraulic system. So-called load sensing systems are known including means to sense the load pressure which occurs at the highest loaded consumer which load pressure signal is supplied to a pump control valve for adjusting the pump delivery rate required. The pump control valve thus adjusts the pump delivery rate of the pump in response to the flow rate through the consumer. However, when the maximum delivery rate is reached or when the delivery rate cannot be further increased by some reasons and when one of the consumers signalizes a requirement for an increased flow rate the hydraulic system changes in a state of under-supply and the highest loaded consumer comes to a stop. In order to avoid this the prior art provided means to restrict the flow rate to the consumers, for example by switching off a consumer or by a proportional decrease of flow rate to all consumers.

German P 26 51 325 discloses a hydraulic system in which the directional valves controlling the consumers are hydraulically controlled via pilot valves. In the state of undersupply the pilot pressure acting on the directional valves may be decreased to reduce the flow rate through the consumers. German P 35 32 816 discloses a hydraulic system in which a pressure compensating valve each cooperates with each directional valve for a load-independent control of the flow rates. In this system a hydraulic signal is generated in the state of under-supply which signal acts on the pressure compensating valves for an adjustment in the closing direction. In addition to systems above referred to providing a load pressure responsive hydraulic control German P 35 46 336 teaches to reduce the supply voltage delivered to electrical control means controlling the directional valves of the consumers when the pump delivery rate is not any more sufficient to supply the required volume. In this system the desired values for the flow rates to the consumers are defined by electrical signals which are summed up and compared with a limit signal corresponding to the maximum pump delivery rate. The control thus takes place in response to the desired values of the flow rates.

The object of the present invention is to reduce the expenditure for actuating the servo devices of the hydraulic system when the pump power is not sufficient and to ensure in a particularly simple manner that the flow rates to the consumers are adjusted to the pump capacity available. The term "pump power" or "pump capacity" is to be understood as defining a delivery rate of the pump or an exaggerated pressure or a state of operation in which the driving means of the pump reaches a limit. A further object is to adjust the pump delivery rate to the volume the consumers require.

SUMMARY OF THE INVENTION

According to the present invention a circuitry for controlling the control coils of servo devices in a hydraulic system, in particular for controlling hydraulic valves for adjusting a predetermined flow of fluid to at least a consumer and for adjusting the delivery rate of at least a variable displacement pump, comprises means for increasing the pump delivery rate in response to a requirement of at least a consumer and means for decreasing the delivery rate to at least a consumer in response to an under-supply in the hydraulic system, and is characterized in that an electrical limit signal is generated in response to an unsufficient power of the pump which signal is delivered to an electronic control circuit for controlling the control coil of at least a servo device to reduce the flow delivery rate to at least a consumer.

According to a further embodiment of the invention the control signal actuating the servo devices is reduced in increments or in steps until the pump delivery rate available becomes adequate to satisfy the consumer's requirement and until the limit signal is switched off. The limit signal may be either used to reduce the control signals for all consumers or may be used to reduce or to interrupt the flow rate to selected consumers in a priority system, while the flow rate to consumers of priority is maintained. This decision is made by the electronic control circuit.

Still further the requirement of fluid as determined by a consumer, in particular by the load leading consumer, is used to generate a limit signal which activates via the control circuit the pump adjusting means to increase the pump delivery rate, i.e. to increase the pivotal angle of a variable displacement pump. Alternatively, the limit signal may be used to activate a further pump. Still further, increasing the delivery rate is again controlled in steps until the limit signal disappears when the fluid requirement of the consumers is fulfilled.

Vice versa the pump delivery rate may be incrementally reduced when the consumer's limit signal is switched off or when the limit signal indicating a hydraulic under-supply is switched off such that the control of the fluid flow is optimized in response to the limit signal and the incremental adjustment of the pump delivery rate.

The limit signal may be generated as a function of pressure in a pressure sensor, in response to the flow rate as a function of temperature or in any other manner, in particular path- or stroke-dependent when a servo device reaches an end position corresponding to a maximum pump delivery rate or to a maxim stroke of a pressure compensating valve cooperating with a consumer for example.

The control signal for the servo devices of the hydraulic system may be adjusted in different modes when the limit signal occurs. To reduce the flow rates to the consumers in a state of under-supply the control signal may be multiplied with a factor to decrease the stroke of the valves controlled. This may be repeated in steps until the limit signal disappears. Particularly simple circuitries result when the control coils of valves are activated with pulse width modulated signals. For example, the pulse width modulated control signal may be scanned with a signal of higher frequency so that the average value of the control signal is decreased thus reducing the valve stroke. Provided the higher frequency signal alike is modulated for pulse width, the average value of the control signal may be adjusted alike. To increase the control signal the pulse width has to be extended. In any case little expenditure is necessary to electronically control the control signals for the solenoid valves in response to a limit signal indicating a hydraulic under-supply to obtain a suitable restriction of the flow rates to the consumers.

The circuitry is further simplified when the control circuit is a micro-processor including a table memory reading out an output signal for the servo device which corresponds to an input signal defining a desired value whereupon the output signal is delivered to the signal input of a driver stage to generate a pulse width modulated control signal. For example- selecting an input signal suitable to increase the stroke of a directional valve for a consumer results in generating the limit signal indicating that the pump is in the under-supply mode the table memory is used to read out a lower value for the control signal to shorten the pulse width of the control signal in the driver stage to reduce the stroke of the valve.

On the other hand the characteristics of the pump control valve is stored in the table memory so that an increased value of the control signal may be read out from the memory when the limit signal is generated to increase the pump delivery rate.

BRIEF DESCRIPTION OF THE DRAWINGS

Other advantages and features of the invention will appear from the following description of a non-limiting embodiment including modifications with reference to the figures which show.

DESCRIPTION OF THE PREFERRED EMBODIMENTS

Figure 1:
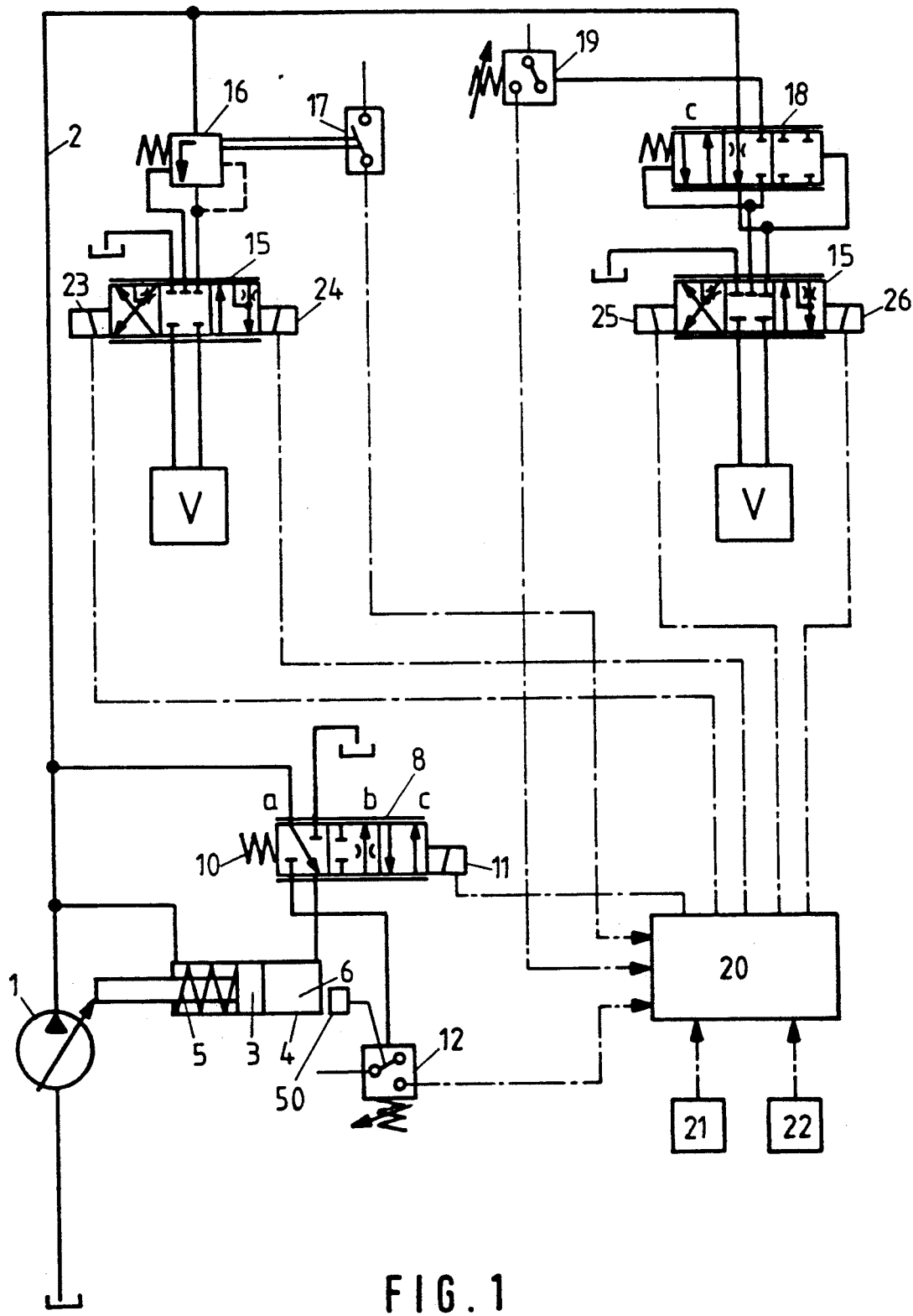
FIG. 1 a simplified diagram of hydraulic system including a variable displacement pump, a pair of consumers and a control circuit FIG. 2 a pulse width modulated output signal of the control circuit, FIG. 3 signal curves of a control signal superimposed with a higher-frequency signal, FIG. 4 a circuitry to generate a super-imposed control signal, FIG. 5 a modified circuitry for generating a superimposed control signal, FIG. 6 an integration stage for modifying the control signal and FIG. 7 a control circuitry including a microprocessor and a table memory.

FIG. 1 shows a variable displacement pump 1 which delivers fluid to a pump pressure line 2, which is connected to a pair of consumers V. The hydraulic adjustment of the pump comprises a piston 3 in a servo cylinder 4 which piston is urged by a spring 5 towards maximum delivery rate against the pressure in the chamber 6 urging the piston towards minimum delivery rate of the pump. The pressure in the chamber 6 is controlled by pump control valve 8, which is a proportional solenoid valve which is actuated by a control coil 11 against the force of a spring 10. The working positions of the valve 8 are labelled a and b. In the position a the pressure in the chamber 6 is increased to adjust the pump towards lower delivery rate, whereas in the position b the pressure in chamber 6 may be vented to a reservoir resulting in adjusting the pump to higher delivery volumes.

Following the control range the valve 8 has an additional position c to connect chamber 6 to the reservoir and to connect a limit switch 12 to the pump pressure line 2 across a control land on the valve piston. In the state of hydraulic under-supply in which the pump 1 is adjusted to maximum delivery rate the valve 8 switches to the end position c so that the pressure switch 12 is actuated and the limit signal generated.

Each consumer V is connected via a proportional directional solenoid valve 15 and a pressure compensating valve 16 and 18 to the line 2. The pressure compensating valve 16 is a conventional model including a valve piston which is actuated by the pressure difference across the directional valve 15 to adjust the flow delivery rate. As shown the pressure upstream of the valve 15 acts on the valve 16 to close the valve and the load pressure which is sensed downstream of the valve 15 acts to open the valve 16. When the pressure compensating valve 16 is fully opened this end position is used to close a limit switch 17 generating a limit signal indicating the end position of the pressure compensating valve and thus signaling that the consumer V requires an increased delivery rate. By way of example the pressure compensating valve 18 is a modified model having an end position c to indicate that the consumer needs more flow volume. In the end position c the load pressure downstream of the directional valve 15 is supplied to the pressure switch 19 which delivers the limit signal. It should be understood that the functions of both valves 16 and 18 are identical, but activating the limit switches 17 and 19 may be different either mechanical or hydraulic. The same applies to generating the limit signal in the pressure switch 12 which could be generated by a position switch 50 which is attached to the adjusting piston 3 of the pump 1. All the limit signals from switches 12, 17 and 19 are delivered to an electronic control circuit 20. Each directional valve 15 is controlled by potentiometers or transmitters 21 and 22 adjusting a desired value which is supplied to the circuit 20 for generating a corresponding control signal for the control coils 23, 24 and 25, 26 of the valves 15. Further a control signal is generated by the circuit 20 to be supplied to the solenoid 11 of the valve 8 to control the delivery rate of the pump 1. Preferably all the control signals are pulse width modulated signals.

OPERATION

The operation is as follows: An increased flow requirement for one or both consumers V is indicated by closing switches 17 and/or 19. Consequently the delivery rate of pump 1 has to be increased. Accordingly the control circuit 20 increases the control signal to the control coil 11 of valve 8 in response to the limit signal from switches 17 and/or 19. The delivery rate is increased in steps until the limit signal is switched off indicating that the pump delivers sufficient volume. Now the pressure compensating valves 16 and/or 18 return from the end position c to the working position. Following this, the operation of the pump is controlled in the reverse: the control signal to coil 11 of the valve 8 is decreased, again in steps, to reduce the pump delivery rate. This is continued until the valves 16 or 18 of the load leading consumer are switched again to the end position c indicating an increased hydraulic requirement so that the limit signal is generated again, which is used to incrementally increase the pump delivery rate. By this control operation the flow rate of the pump is optimized. When the pump 1 delivers the maximum rate the switch 12 closes and a signal is supplied to the circuit 20. This signal indicates that the flow rates to all individual consumers should be reduced in proportional relationship or that at least a consumer should be disconnected from the line 2, for example the fastest running consumer, whereas the priority consumers should continue to be supplied with full flow rate.

Figure 2:
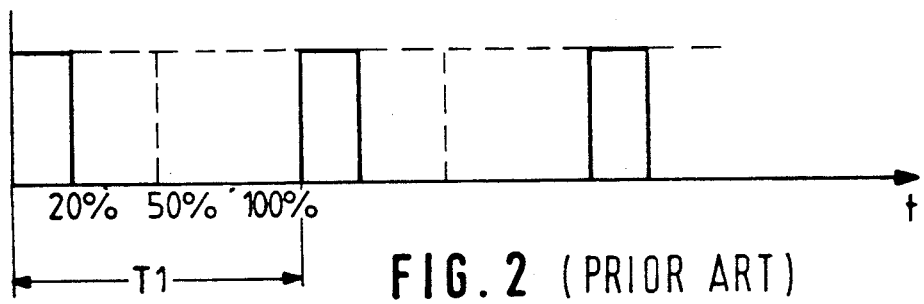

Various embodiments to vary the control signals for the control coils are explained as follows: Preferably the control coils are driven by a pulse width modulated signal as shown in FIG. 2. The signal has a constant amplitude and fixed frequency as indicated by $T_1$. The pulse width or pulse duration defines an operation time between 0 and 100% resulting in an average value and a corresponding displacement of the valve. This is prior art.

Figure 3A:
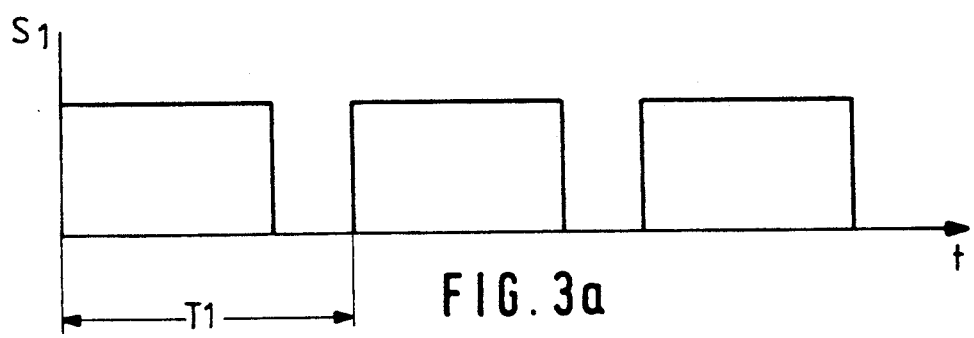
Figure 3B:
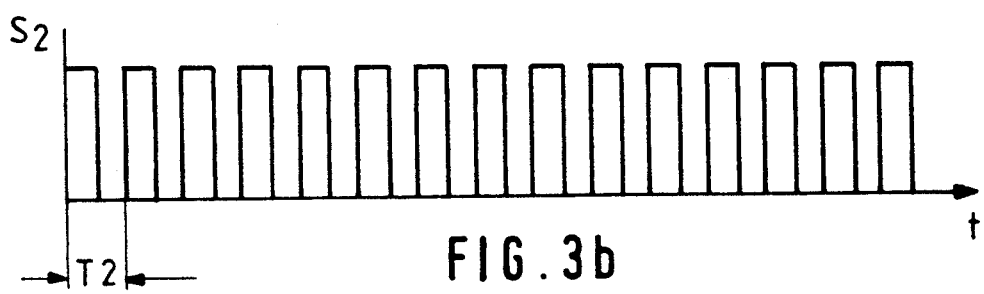
Figure 3C:
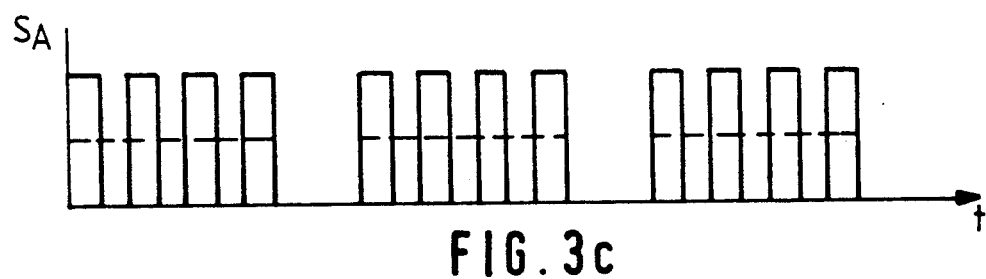

FIG. 3 shows a pulse width modulated control signal $S_1$ super-imposed by a higher frequency signal $S_2$ having a higher frequency corresponding to $T_2$ and which is pulse width modulated. The control signal $S_1$ is scanned by the Signal $S_2$ generating a control signal $S_A$ having an average value which is defined by the pulse length of the higher frequency signal $S_2$. According to the embodiment shown the pulse duration of the higher frequency signal $S_2$ is used to vary the mean value of control signal $S_A$ between 0 and 100%.

Figure 4:
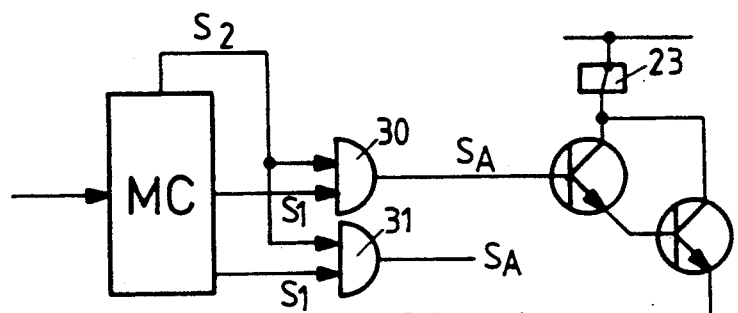

An embodiment of a suitable circuitry is shown in FIG. 4. The electronic control circuit 20 comprises a microprocessor MC. A first output signal of the microprocessor to control a first valve is connected to a first input of an AND-gate 30 and a second output for a second valve is connected to a first input of an AND-gate 31. Both the second inputs of the AND-gates are connected via a common line $S_2$ to an output pin of the microprocessor. The output of each AND-gate is connected to a Darlington amplifier stage. FIG. 4 shows one of the amplifying stages only to activate the control coil 23 of the directional valve 15 for example. Thus, the first input of each AND-gate is supplied with a pulse width modulated signal $S_1$ and the second input of the AND-gates is supplied with the higher frequency signal $S_2$. As long as signal $S_1$ is delivered the signal $S_2$ is released through the AND-gate 30 and/or 31. As mentioned before, the mean value of the pulse width modulated signal $S_1$ may be additionally varied by the frequency and the pulse duration of the signal $S_2$. FIG. 3 shows the mean value for the output signal $S_A$ in dotted lines. Thus, the control signal may be simply reduced when the limit signal is generated by the microprocessor super-imposing a higher frequency signal $S_2$.

Figure 5:
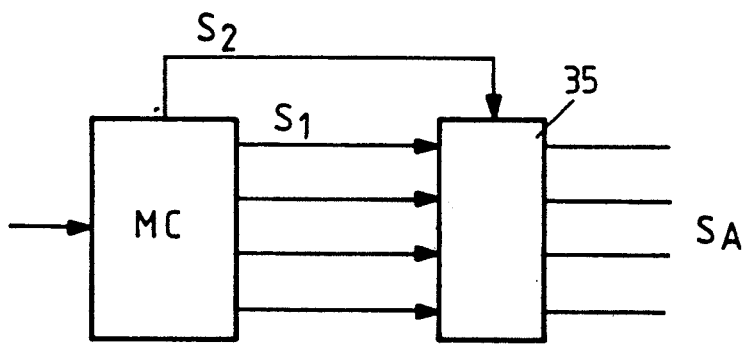

FIG. 5 shows an embodiment in which the AND-gates are replaced by an input-output-module 35. This module is prior art and is used to switch on and off signal lines to amplifier stages not shown. The module 35 is connected via an ENABLE-line to the microprocessor MC. Via this ENABLE-line the module 35 receives an on- or off-signal to release all signal lines from the microprocessor or to lock them: Assuming that a limit signal caused by hydraulic under-supply is generated, the microprocessor delivers the higher frequency signal $S_2$ to the module 35 via the ENABLE-line to scan or strobe all control signals $S_1$ which are delivered from the microprocessor via the module 35 to the amplifier stages. Accordingly the average value of signal $S_1$ is reduced in proportional relationship and the piston members of the directional valves are set back correspondingly.

Figure 6:
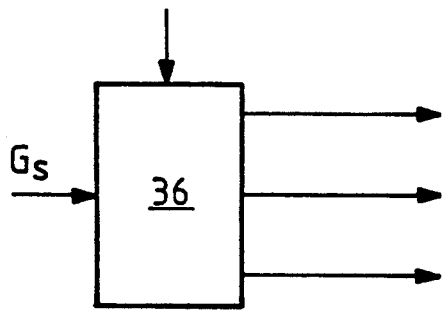

FIG. 6 shows a further embodiment to reduce the control signals which are delivered to the driving stages for controlling the solenoids. The circuitry comprises a Bool-integrator 36 multiplying the control signals with a factor to lower the signals when the limit signal $G_s$ is generated.

Figure 7:
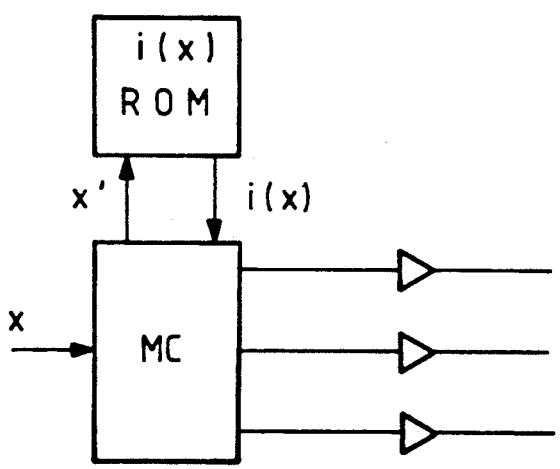

Still further, FIG. 7 shows a control electronic comprising a microprocessor MC, a memory ROM and a number of driving stages for controlling the solenoids of servo devices. As in the description of FIG. 4 the output signal of the microprocessor again defines a direct control signal for the signal input of the driving stages. The field of response curves for each servo device is stored in the memory ROM. For example for a directional valve the current value for each valve displacement (flow rate) is stored at a location of the memory. To read-out a current value from the memory in response to an input value $x_{soll}$ as a desired value defining a desired displacement of the valve piston the microprocessor uses the memory address as input to read-out the current value $i(x)$ from the memory location. While the memory was loaded with the current values at the memory locations and the corresponding valve displacements at the memory addresses, reading out the memory is reverse in that the addresses are called-up by supplying desired input values for the displacements, thus reading-out the corresponding current values from the memory locations. This has the advantage that an ideal response curve of the servo device is read-out from the memory without performing any correction processes for the signals. Moreover, for varying the current value in response to a limit signal generated a different memory address is selected to provide for a higher or lower current value. Accordingly, the circuitry incorporating the microprocessor MC and the memory ROM in FIG. 7 replaces the circuitries shown in FIGS. 4, 5 and 6. According to FIG. 7 the microprocessor delivers a signal x' to the memory for the valve displacement when the limit signal is generated and the memory supplies a current value $i(x')$ which is lower to restrict the flow rates to the consumers in the state of a hydraulic under-supply and which is higher to adjust the pump to a higher delivery rate in the state of higher flow requirement.

Still further, varying the current of the control signals may be used to operate valves of different nominal currents. For example, the driver stages may be selected for valves having nominal currents of 5 A. It is easily possible to drive a valve having a nominal current of 1 A by scanning the control signal correspondingly so that the average value of the scanned control signal does not exceed the nominal value of 1 A.

In the embodiment shown in FIG. 1 the limit signals are generated in response to a displacement or in response to a pressure change. The limit signals may be generated in response to power or speed and may be used to vary the control signals of servo devices.

Instead of generating the limit signals by transmitters or switches predetermined limit values may be calculated for a hydraulic system which values will be stored in a memory or in a microprocessor. For example the maximum adjustment values in response to the pressure, the maximum pressure in response to the delivery rate or the maximum pressure for a predetermined driving speed may be stored. The memory values then replace the switch 12 shown in FIG. 1 so that by scanning the memory a corresponding limit value may be read-out to be used in the same mode as the limit switch to control the flow rate to the consumers.

I claim:

1. A circuitry for controlling control coils of servo devices in a hydraulic system, in particular for controlling hydraulic valves for adjusting a predetermined flow of fluid to at least a consumer and for adjusting the delivery rate of at least a variable displacement pump, comprising means for increasing the pump delivery rate in response to a requirement of at least a consumer and means for decreasing the delivery rate to at least a consumer in response to a hydraulic under-supply in the hydraulic system, characterized in that a first electrical limit signal is generated in response to an unsufficient capacity of the pump which signal is delivered to an electronic control circuit for controlling the control coil of at least a servo device to decrease the flow delivery rate to at least a consumer; and wherein the generation of said first electrical limit signal is solely and exclusively based upon the physical event of said variable displacement pump attaining its maximum delivery rate; wherein a second electrical limit signal is generated in response to an unsufficient flow rate to at least a consumer which second signal is delivered to said electronic control circuit for controlling the control coil of a further servo means to increase the pump delivery rate; and wherein the generation of said second electrical limit signal is solely and exclusively based upon the physical event of a valve associated with a consumer attaining a predetermined specific position.

2. A circuitry for controlling control coils of servo devices in a hydraulic system, in particular for controlling hydraulic valves for adjusting a predetermined flow of fluid to at least a consumer and for adjusting the delivery rate of at least a variable displacement pump, comprising means for increasing the pump delivery rate in response to a requirement of at least a consumer and means for decreasing the delivery rate to at least a consumer in response to a hydraulic under-supply in the hydraulic system, characterized in that an electrical limit signal is generated in response to an unsufficient capacity of the pump which signal is delivered to an electronic control circuit for controlling the control coil of at least a servo device to decrease the flow delivery rate to at least a consumer; wherein the control coils are controlled by pulse width modulated signals; and wherein after generating a limit signal caused by the pump, the pulse width modulated control signal is super-imposed with a pulse width modulated signal of higher frequency, wherein the higher frequency signal additionally varies the time duration of the control signal and thus the average value thereof.

3. The circuitry of claim 2, wherein the control signal and the higher frequency signal each are supplied to a respective input of an AND-gate.

4. The circuitry of claim 2, wherein the control signal is supplied to an input of an input-output-module and the higher frequency signal is supplied to the ENABLE terminal of the input-output module.

5. A circuitry for controlling control coils of servo devices in a hydraulic system, in particular for controlling hydraulic valves for adjusting a predetermined flow of fluid to at least a consumer and for adjusting the delivery rate of at least a variable displacement pump, comprising means for increasing the pump delivery rate in response to requirement of at least a consumer and means for decreasing the delivery rate to at least a consumer in response to a hydraulic under-supply in the hydraulic system, characterized in that an electrical limit signal is generated in response to an unsufficient flow rate to at least a consumer which signal is delivered to an electronic control circuit for controlling the control coil of a servo means to increase the pump delivery rate; and wherein the generation of said electrical limit signal is solely and exclusively based upon the physical event of a valve associated with a consumer attaining a predetermined specific position; and wherein the pump delivery rate is incrementally increased in the control circuit until the limit signal is switched off; and wherein after switching off the limit signal generated due to a consumer the delivery rate is incrementally decreased until the limit signal is generated again.

6. The circuitry of claim 5, wherein the valve of the consumer has an end position to actuate a switch or to activate a signal line for a pressure signal actuating a switch.

7. The circuitry of claim 6, wherein the valve is defined by a pressure compensating valve of a consumer.

8. The circuitry of claim 5, wherein the driving stages for the control coils are actuated in response to output signals of a microprocessor, wherein the microprocessor includes a memory for storing an output signal corresponding to an input signal each of a servo device and for reading-out a signal to increase or decrease the control signal when a limit signal is generated and wherein the signal read-out from the memory is larger or smaller than a desired signal delivered to the microprocessor.

9. The circuitry of claim 5, wherein the control signal is multiplied in an integrator with a factor to decrease the control signal when a limit signal caused by the pump is generated.

* * * * *